(12) United States Patent
Louvel et al.

(10) Patent No.: US 7,379,310 B2
(45) Date of Patent: May 27, 2008

(54) OVER-VOLTAGE PROTECTION CIRCUIT FOR A SWITCHED MODE POWER SUPPLY

(75) Inventors: Jean-Paul Louvel, Brigachtal (DE); Daniel Lopez, Villingen-Schwenningen (DE); Harald Grellmann, Königsfeld im Schwarzwald (DE)

(73) Assignee: Thomson Licensing, Boulogne-Billancourt (FR)

( * ) Notice: Subject to any disclaimer, the term of this patent is extended or adjusted under 35 U.S.C. 154(b) by 183 days.

(21) Appl. No.: 11/114,208

(22) Filed: Apr. 22, 2005

(65) Prior Publication Data

US 2005/0237044 A1 Oct. 27, 2005

(30) Foreign Application Priority Data

Apr. 23, 2004 (EP) .................................. 04009677

(51) Int. Cl.
- H02H 7/10 (2006.01)
- H02H 7/00 (2006.01)
- H02H 3/20 (2006.01)

(52) U.S. Cl. .............................. 363/50; 361/18; 361/90
(58) Field of Classification Search ................. 361/18, 361/90, 91.1; 363/50, 56.03, 56.07, 56.08, 363/56.1, 56.11; 323/222
See application file for complete search history.

(56) References Cited

U.S. PATENT DOCUMENTS

| 4,847,720 A | * | 7/1989 | Dezonno ...................... 361/18 |
| 4,890,210 A | | 12/1989 | Myers |
| 5,091,816 A | * | 2/1992 | Juntenen ...................... 361/18 |
| 5,617,013 A | * | 4/1997 | Cozzi .......................... 323/222 |
| 5,625,279 A | * | 4/1997 | Rice et al. .................... 323/283 |
| 6,055,167 A | | 4/2000 | Shamkovich et al. |
| 7,120,000 B2 | * | 10/2006 | Pidutti et al. ............... 361/91.1 |
| 7,164,591 B2 | * | 1/2007 | Soldano ....................... 363/89 |

FOREIGN PATENT DOCUMENTS

| EP | 0 582 813 A | 2/1994 |
| EP | 0 806 833 A | 11/1997 |
| WO | WO 96/28878 | 9/1996 |

OTHER PUBLICATIONS

Unitrode Corporation, UC3854 Datasheet, High ower Factor Preregulator, Unitrode, Jun. 1998, pp. 1-9.*
Search Report dated Nov. 12, 2004.

* cited by examiner

Primary Examiner—Jeffrey L. Sterrett
Assistant Examiner—Harry Behm
(74) Attorney, Agent, or Firm—Joseph J. Laks; Robert B. Levy; Jorge Tony Villabon

(57) ABSTRACT

The switched mode power supply comprises an inductor, a switching transistor, a controller circuit coupled to the switching transistor, a rectifying means and a feedback regulation loop for providing a stabilised output voltage. It comprises further a protection circuit coupled to an output or input of a comparator of the controller circuit for providing an overvoltage protection in case of a failure of the regulation loop. The protection circuit comprises in particular an integrating circuit and a comparating circuit. In a preferred embodiment, an output of the protection circuit is coupled to a sense input of the controller circuit, for switching off the controller circuit immediately in case of a failure. In another aspect of the invention, the protection circuit comprises further a second comparator coupled to the first comparating circuit for the surveillance of the input voltage of the switched mode power supply, and for the detection of a short circuit of the inductor or the rectifying means.

14 Claims, 4 Drawing Sheets

OVER-VOLTAGE PROTECTION CIRCUIT FOR A SWITCHED MODE POWER SUPPLY

This application claims the benefit, under 35 U.S.C. § 119 of European Patent Application 04009677.8, filed Apr. 23, 2004.

FIELD OF THE INVENTION

The invention relates to a switched mode power supply providing a regulated output voltage, which comprises protection circuits against failures, for example for over-voltage protection. In particular, the invention relates to an upconverter circuit, applicable as a power factor correction pre-converter.

BACKGROUND OF THE INVENTION

It is well known to equip switched mode power supplies with protection circuits, for example for over-voltage protection, over-current protection, low mains voltage, or short circuit protection. Power supplies comprising an integrated controller circuit are already provided with respective protection circuits.

In several countries it is now required to equip switched mode power supplies with a power factor correction (PFC), for reducing the permissible low frequency harmonic content of the waveform of the mains input voltage. For this purpose a step-up pre-converter may be used comprising an integrated controller circuit, which offers a compact and very effective PFC solution. Integrated circuits of this kind are for example the MC33260, manufactured by OnSemiconductor (http://onsemi.com), and L6562 manufactured by ST Microelectronics (www.st.com). Upconverter power supplies of this kind comprise a regulation loop for providing a constant output voltage. These integrated controllers comprise a variety of integrated protection circuits for the case of a malfunction of the power supply as described in corresponding data sheets.

In FIG. 1 a block diagram of the integrated controller circuit L6562 is shown. The operation of this controller circuit is known for persons skilled in the art, and a detailed description as well as application circuits are described in an datasheet, available via Internet or from ST Microelectronics, which is incorporated herewith by reference.

The integrated circuit L6562 in particular has an integrated over-voltage detection circuit in response to the comparator operating as an error amplifier, which is connected with is negative input to the pin 1. This over-voltage detection circuit has the following function: When the load of the PFC pre-regulator is very low, the output voltage of the power supply tends to stay steadily above the nominal value, and which cannot be handled by the regulation of the L6562. If this occurs, however, the comparator output will saturate low. Hence, when this is detected, the driver circuit of the L6562 is switched-off, and therefore also the external power transistor. This is regarded as a static overvoltage protection.

When the comparator goes back into its linear regulation region, the controller IC L6562 resumes to normal operation. As the result, in case of very low load, the L6562 will work in a burst mode, with a repetition rate, which can be very low. The overvoltage detection circuit coupled to the error amplifier provides also a dynamic overvoltage protection in case of a high load drop, as explained in the data sheet.

SUMMARY OF THE INVENTION

The switched mode power supply according to the invention comprises an inductor, a switching transistor, an integrated controller circuit coupled to the switching transistor, a rectifying means and a feedback regulation loop for providing a stabilised output voltage. It comprises further a protection circuit coupled to an output or input of a comparator of the controller circuit for providing an over-voltage protection in case of a failure, in particular in case of an interruption, of the regulation loop. The protection circuit comprises in a preferred embodiment an integrating circuit and a comparating circuit for controlling the output level or the input level of the comparator of the controller circuit, for switching off the switched mode power supply in case of a failure of the regulation loop.

The comparator output of the integrated controller circuit provides a slowly changing control information, with regard to the switching frequency of the switched mode power supply, which is used internally by the controller circuit for controlling the turn-off time of the switching transistor. This output voltage lies therefore during normal operating conditions within a small voltage interval, and only during fast load or voltage transitions, for example when switching on the power supply, this voltage steps to its maximum or minimum level for a short time. With the integrating circuit, these special operating conditions are levelled out, and only when the output voltage of the comparator keeps its extreme voltage level for a longer time period, the comparating circuit of the protection circuit becomes active and switches off the switched mode power supply.

In a preferred embodiment, an output of the protection circuit is coupled to a sense input of the controller circuit, for switching off the controller circuit immediately in case of a failure. In another aspect of the invention, the protection circuit comprises further a second comparator coupled to the first comparating circuit for the surveillance of the input voltage of the switched mode power supply, and for the detection of a short circuit of the inductor or the rectifying means.

The switched mode power supply comprises therefore a protection circuit, which avoids a rise of the output voltage to intolerable values in case of a failure of the feedback regulation loop for the output power regulation. This would lead to the destruction of circuit components. This protection circuit operates independently of any over-voltage protection circuits already included in the integrated controller circuit. Because the integrating circuit is in particular sensitive to an extreme voltage level of the feedback loop for a longer time period, the comparating circuit of the protection circuit monitors all conditions which could be dangerous to the switched mode power supply or other circuit components.

BRIEF DESCRIPTION OF THE DRAWINGS

Preferred embodiments of the invention will be explained with regard to schematic drawings, which show.

DETAILED DESCRIPTION OF PREFERRED EMBODIMENTS

Figure 2A:
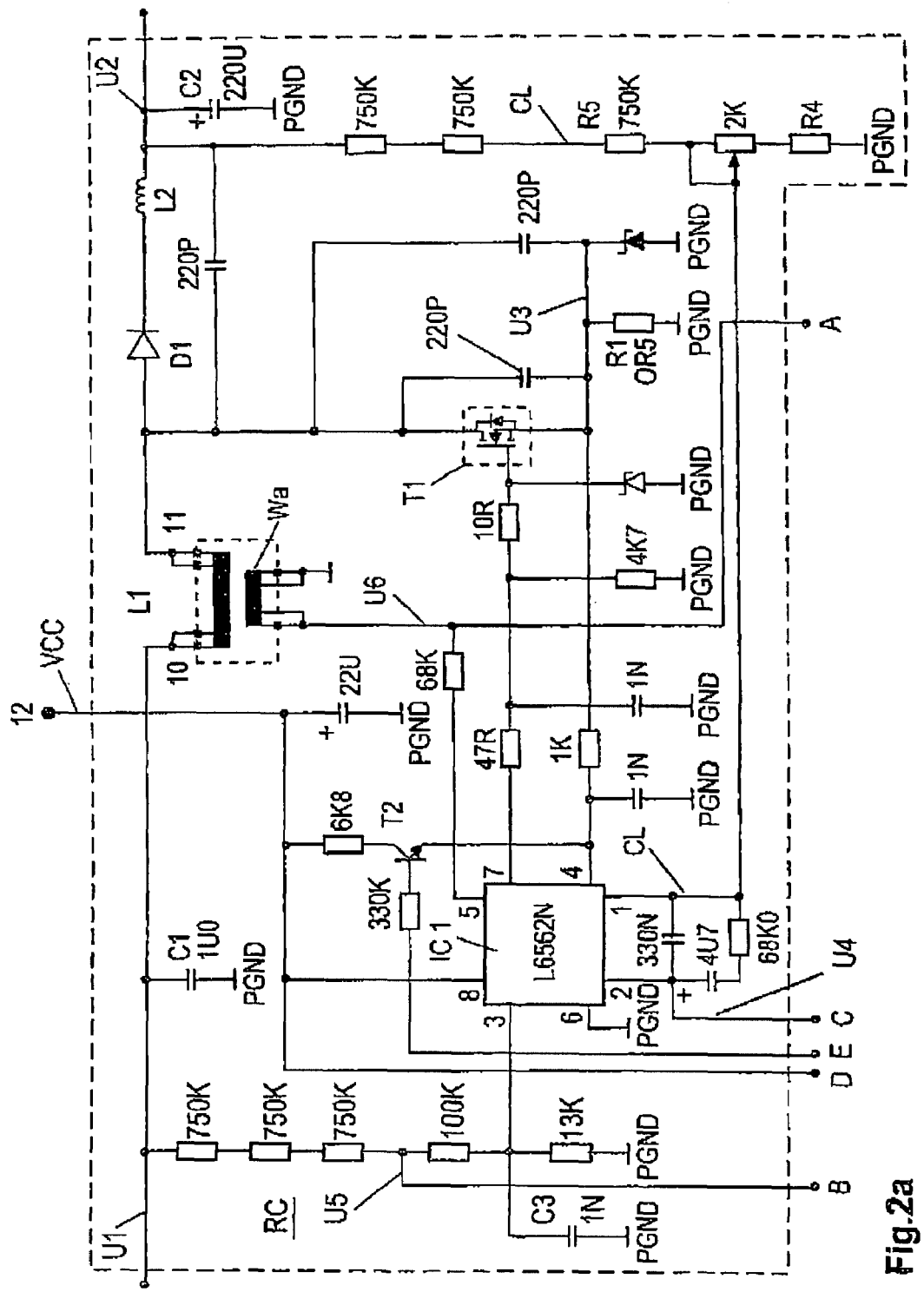
FIG. 2a An upconverter circuit comprising an integrated controller circuit.

In FIG. 2a a switched mode power supply is shown operating with an input voltage U1. The voltage U1 is in particular a rectified voltage, provided for example by a bridge rectifier, not shown, connected to a mains supply voltage. For a reduction of interference noise, the voltage U1 is filtered by a capacitor C1. As an input voltage U1 also a smoothed DC voltage may be used.

The input voltage U1 is coupled to an input terminal 10 of an inductor L1, which is coupled with an output terminal 11 to a switching power transistor T1, in this embodiment a MOSFET. The current output of the switching transistor T1 is coupled via a low impedance sense resistor R1 to a reference potential, in this embodiment to ground. The switching transistor T1 is operated by an integrated controller circuit IC1, which is coupled with a driver output 7 to a control input of the switching transistor T1.

To the output terminal 11 of the inductor L1 is further coupled a rectifying means D1, a transistor, or in this embodiment a diode D1 for providing a rectified output voltage U2. The voltage U2 is smoothed by a second inductor L2 and a second capacitor C2. Via a feedback loop CL the output voltage U2 is coupled to a feedback input 1 of the integrated circuit IC1 for the regulation of the voltage U2. A voltage U3 generated across the sense resistor R1 is coupled to a current sense input 4 of the integrated circuit IC1 as a second regulation information. A DC voltage VCC is connected to the pin 8 of the integrated circuit IC1 as a supply voltage, which is provided externally in this embodiment via a terminal 12. The input voltage U1 is applied to a multiplier input 3 of the circuit IC1 via a resistive voltage divider chain RC and a capacitor C3 for providing an average value about the level of the input voltage U1 to IC1.

The integrated circuit IC1 is in this embodiment a controller IC L6562, which is optimised for a switched mode power supply operating as a power factor pre-regulator. It operates in this embodiment as a step-up converter providing a higher output voltage U2, as compared with the input voltage U1. Additional passive circuit components are provided for improving the stability and safety of the power supply, and for the reduction of interference noise, but which are not essential for the understanding of the present invention. The power supply as described so far is known from prior art.

Figure 2B:
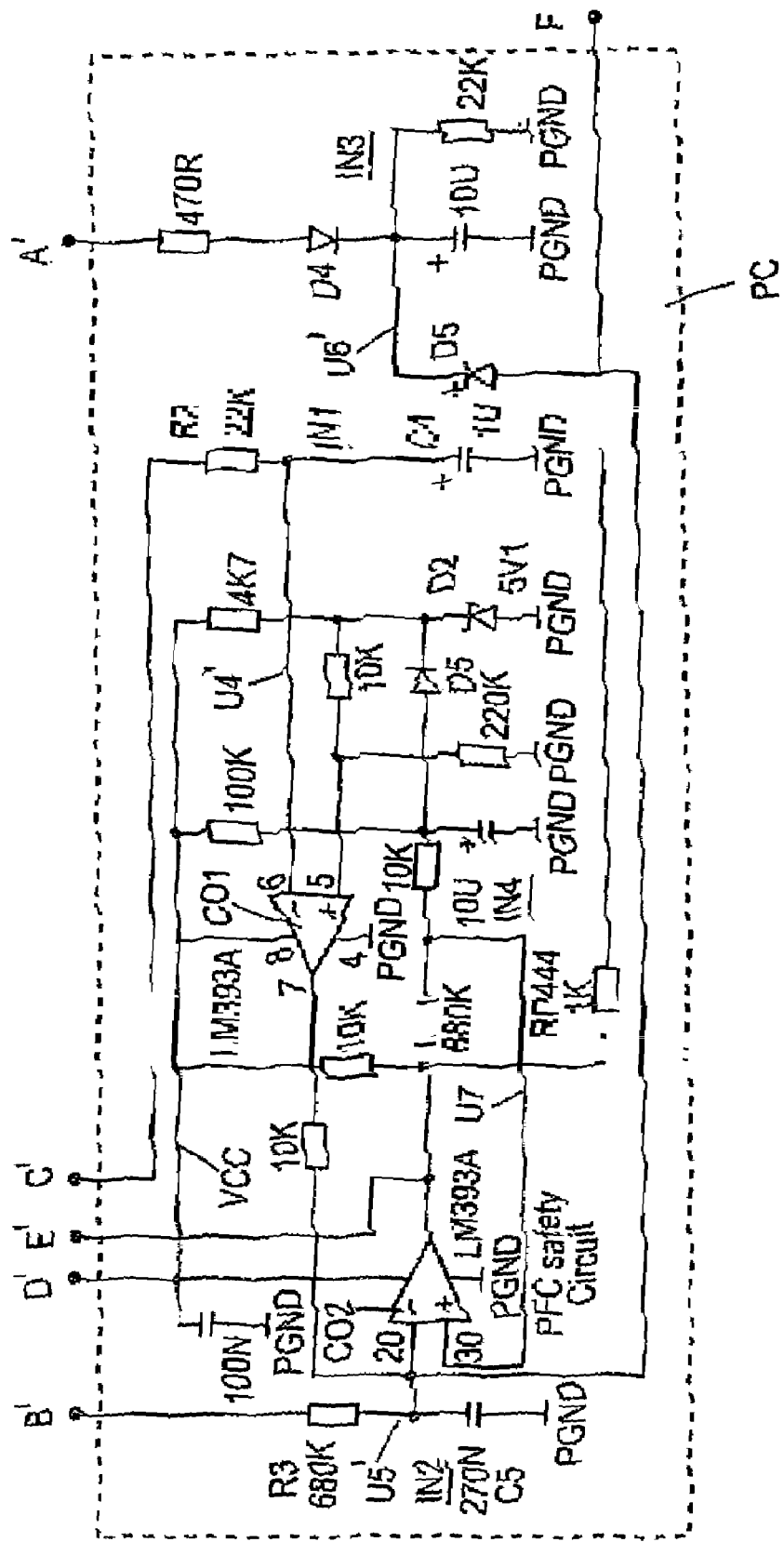
FIG. 2b a protection circuit coupled to the upconverter circuit of the FIG. 2a, and FIG. 3 a controller circuit comprising an integrated protection circuit.

To the power supply of the FIG. 2a a safety circuit PC is coupled as shown in FIG. 2b. The output voltage U4 of the comparator output pin 2 of the integrated circuit IC1 is coupled via connections C, C' to a first integrating circuit IN1 comprising a resistor R2 and capacitor C4 for providing an integrated voltage U4'. The voltage U4' is applied to a first input terminal of a comparating circuit CO1, for comparing voltage U4' with a DC reference voltage provided by a Zener diode D2. The output of the comparating circuit CO1 is coupled to a first input 20 of a second comparating circuit CO2.

Figure 1:
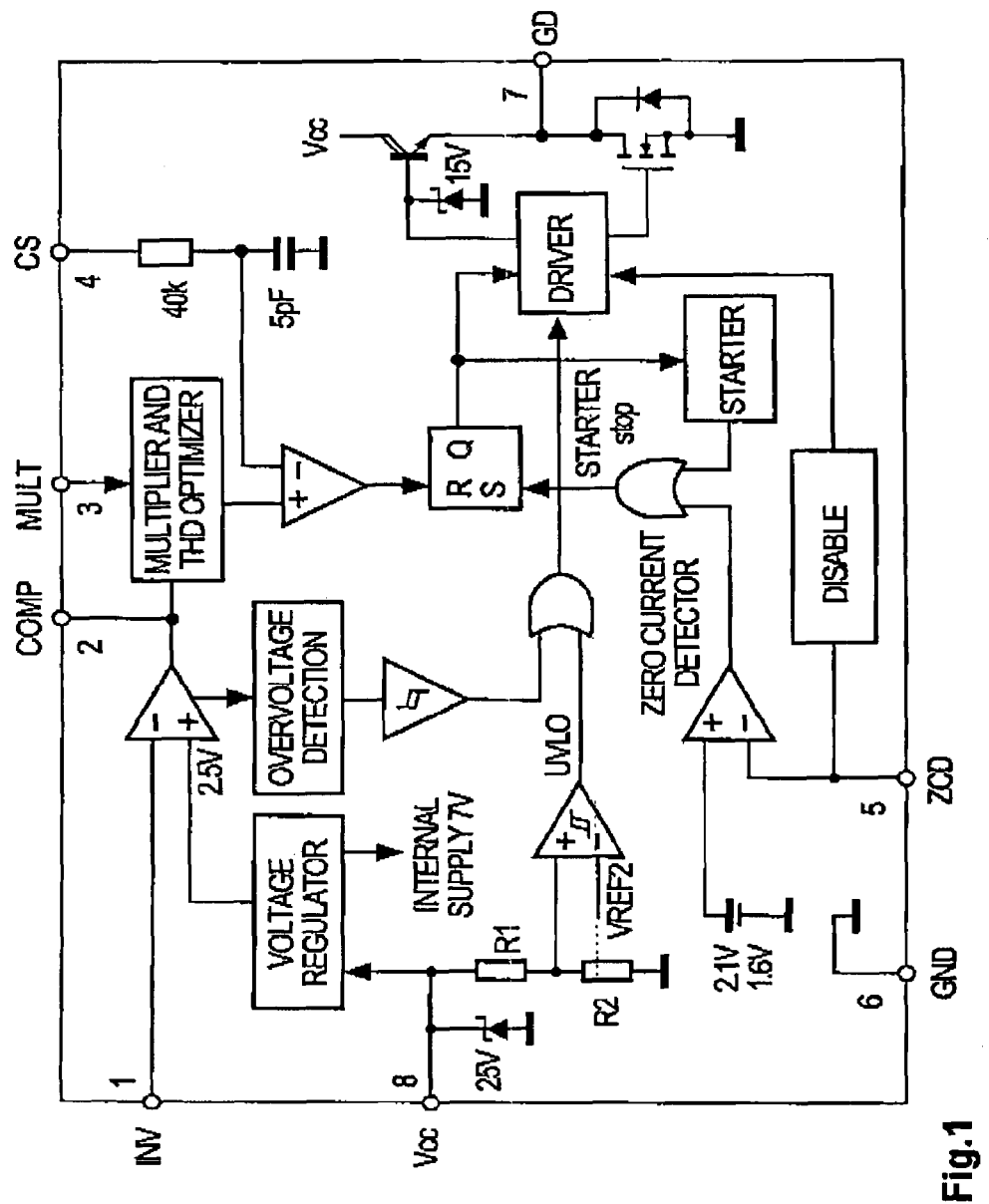
FIG. 1 A block diagram of a known controller circuit.

The input terminal 20 is also coupled via a second integrating circuit IN2 and terminals B, B' to the resistor chain RC, shown in FIG. 1, for providing an information about an average value of the input voltage U1. A voltage U5 provided by the resistor chain RC is filtered by the integrating circuit IN2, a low pass filter with a resistor R3 and capacitor C5, for generating a voltage U5' independent of the voltage ripple as present on the input voltage U1.

To the first input terminal 20 of the second comparating circuit CO2 further a voltage U6' is coupled via a diode D5. The voltage. U6' is generated by a third integrating circuit IN3 from a voltage U6, provided by an auxiliary winding Wa of the inductance L1 of FIG. 1 via connections A, A' and a diode D4. The voltage U6 is an alternating voltage corresponding to the switching frequency of the switching transistor T1, and via the integrator IN3 a smoothed voltage U6' is generated, which corresponds essentially to a DC information. The polarity of the diode D4 is such, that the flyback voltage of the winding Wa, arising when the switching transistor T1 is blocked, is coupled to the integrating circuit IN3.

To the second input terminal 30 of the comparating circuit CO2 a voltage U7 is applied, which is derived via a fourth integrating circuit IN4 from the supply voltage VCC, and which is clamped via a diode D5 to the reference voltage provided by the Zener diode D2. The voltage U7 is a reference voltage for the operation of the comparating circuit CO2.

"The operation of the safety circuit PC shown in FIG. 2b is as follows: When the input voltage U1 is applied to the power supply, the voltage U5' is present at the comparating circuit CO2 with a short delay with regard to the integrator IN2. For the start-up of the power supply further the supply voltage VCC is applied, which arrives always after the input voltage U1. With the voltage VCC the comparating circuits CO1 and CO2 start operating. Because of the delay of the Integrator circuit IN4 and the output impedance of the comparator CO1, it is guaranteed that the voltage U5' is always higher than the voltage U7 at the comparator inputs 20, 20 of the comparating circuit CO2 after switching on the power supply, for keeping the output of CO2 low from the beginning of the operation of the power supply."

Only in case of a malfunction of the feedback loop CL detected by the safety circuit PC, the output of CO2 goes high for switching-off the power supply via a transistor T2. The transistor T2 switches through the supply voltage VCC to the sense input pin 4 of the integrated circuit IC1, which stops the operation of IC1 immediately.

The safety circuit PC provides further a control of the mains input voltage U1 via the voltage U5'. In case voltage U1 drops to a dangerous level, in this embodiment about 150 Volts, which is adjusted via the resistors of the resistor chain RC. In this case the voltage U5' drops below the voltage U7, which causes the output of comparator CO2 to switch high, which switches off the integrated circuit IC1.

In case a short circuit occurs in the inductor L1 or in the diode D1, the voltage U6' drops. Then also the voltage at the first input 20 of CO2 drops also, which causes a switching of the output of comparator CO2 to high for switching of the power supply via IC1. The integrator IN3 is coupled via a diode D4 to the auxiliary winding Wa of the inductor L1 such, that the flyback voltage U6 is coupled to the integrator IN3. In case of a short circuit in diode D1, no output voltage U2 is generated, and therefore no flyback voltage U6 at the auxiliary winding of inductor L1 is established.

In case of an interruption of the feedback loop CL, no voltage, or a very low voltage, is present at pin 1 of the integrated circuit IC1. The controller IC1 assumes therefore, that the output voltage U2 is low and operates the switching transistor T1 in accordance with a maximum load condition, to raise the output voltage U2. This would lead to a dangerous overvoltage to circuit components being coupled to the voltage U2. The time constant of the integrating circuit IN1 is therefore adjusted such, that short term full load conditions are tolerated, but an interruption of the feedback loop CL, which leads to a high voltage U4 at terminal 2 for a longer time interval, is detected by the comparating circuit CO. When the capacitor C4 of integrator IN1 is charged up to a level higher than the reference voltage provided by diode D2, the output of the comparating circuit CO1 switches to low, causing the comparating circuit CO2 to switch to a high output voltage.

The comparating circuits CO1 and CO2 are for example comparators included in an integrated circuit LM393A. Therefore, with a small circuit, including one integrated circuit and a few passive components, three safety functions can be provided for a PFC pre-regulator. In particular, when the pre-regulator operates as an up-converter, an overvoltage protection of the output voltage U2 is an important safety feature.

The power supply as described is used for example within a television set, for providing compliance with power factor regulations. The output of the comparating circuit CO2 may be coupled also via a terminal F to the main power supply of the television set for switching-off.

Figure 3:
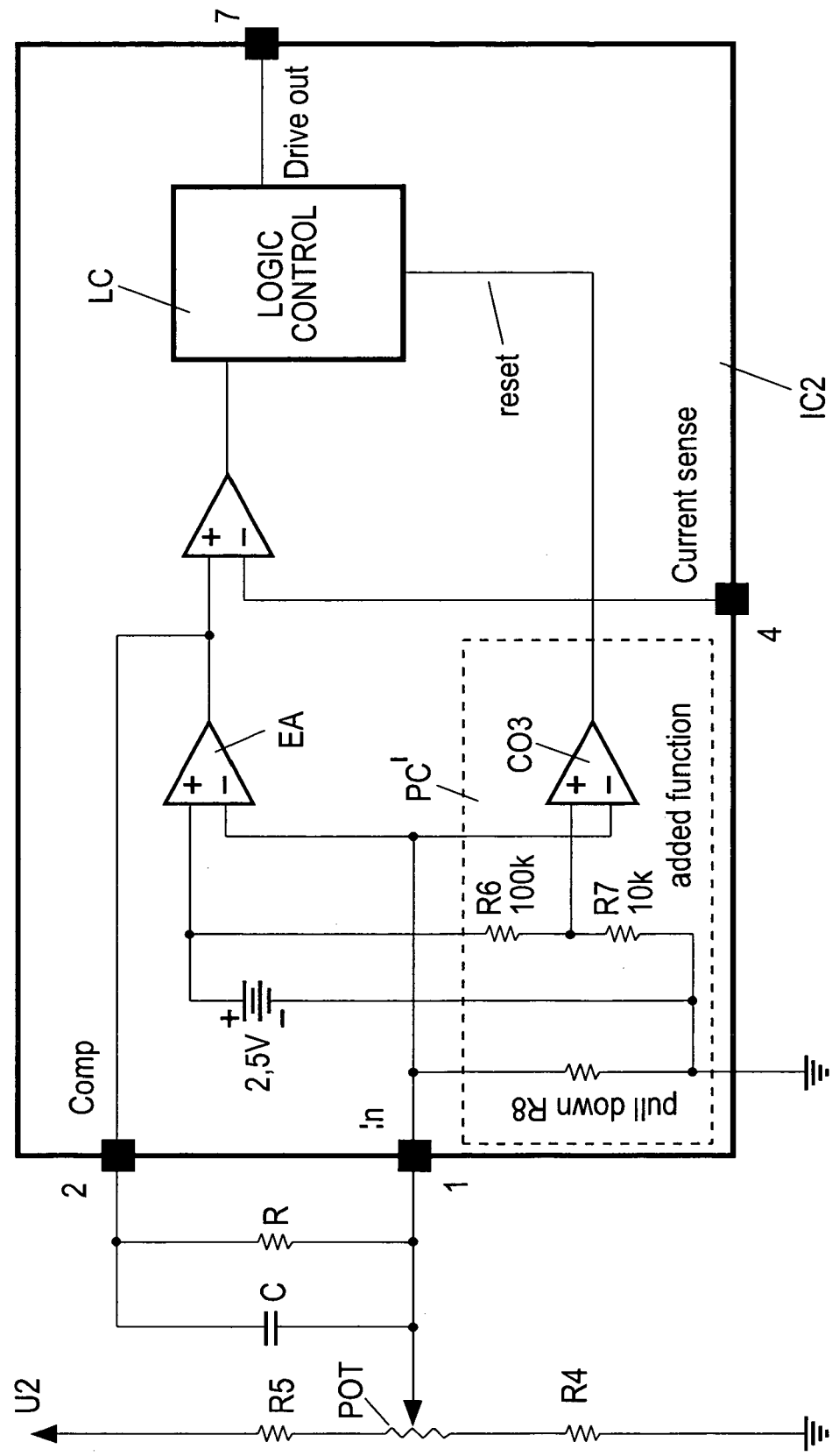

The part of protection circuit providing overvoltage control with regard to the open feedback loop can be integrated also within an integrated controller circuit, as shown in FIG. 3. The feedback loop is connected to pin 1 of an integrated circuit IC2, which is coupled to the negative input of a comparator EA operating as an error amplifier. To the positive input of the comparator EA a reference voltage of 2.5 Volts is coupled. The output of the error amplifier is connected to pin 4 of the integrated circuit IC2 and coupled to a logic control LC, which provides a drive output voltage via pin 7 for an external switching transistor, as shown in FIG. 1 and described in the respective data sheet.

In a further aspect of the invention, the integrated circuit IC2 comprises an integrated protection circuit PC' as shown in FIG. 3. The protection circuit PC' comprises a second comparator CO3, which is coupled with its negative input to the input pin 1 of the integrated circuit IC2 and with the positive input to a voltage divider, resistors R6, R7, which is coupled to a reference voltage of 2,5 Volts. The values of the resistors R6, R7 are chosen such, that a voltage of about 0.25 Volts is applied to the positive input of the comparator CO3.

The output of the comparator CO3 is coupled to the logic control LC, for providing a reset signal, in case the input voltage at pin 1 drops below the voltage level as applied to the positive input of comparator CO3. This is the case, when the feedback loop CL is interrupted, for example in case of a broken solder connection of one of the components of the feedback loop CL. The protection circuit PC' comprises further a pull-down resistor R8, which defines an input impedance for the input pin 1.

The present invention is not limited to the embodiments as described with regard to the figures, and various available modifications come possible for those skilled in the art without departing from the scope of the invention. For example, an input of the comparator CO3 may be coupled to the output instead to the input of the comparator EA for providing a safety protection against an open feedback loop. As comparating circuits and integrating circuits a large variety of useable circuits are known. Also, the protection circuit PC may be arranged such, that the integrator IN is coupled to the input terminal 1 of the control circuit IC1, instead to the comparator output pin 2. This would be advisable, in case a controller circuit is used, which does not have a respective comparator output. But when the output pin 2 is used, the complete feedback loop CL including the input pin 1 is controlled by the safety circuit PC. The safety circuit PC as described may be used in particular for all kinds of switched mode power supplies.

The invention claimed is:
1. Switched mode power supply comprising:
an inductor coupled to an input voltage,
a switching transistor coupled with a current input to said inductor and coupled with a current output via a sense resistor to a reference potential,
rectifying means coupled to said inductor for providing a rectified output voltage,
an integrated controller circuit comprising,
   a driver circuit being coupled to a control input of said switching transistor
   a comparator with a feedback input for a regulation of said output voltage,
   a voltage regulator for providing a reference voltage for said comparator,
   a first over-voltage protection circuit coupled with an input internally to said comparator for switching off said driver circuit in case of a low load condition, and
   a sense input coupled to said sense resistor,
a feedback loop coupling said rectified output voltage to said feedback input, and
a second over-voltage protection circuit comprising a second comparing circuit, which comprises a first input, to which an output of a first comparing circuit and a short circuit information provided by said inductor is coupled, the output of said second comparing circuit being coupled to said sense input for switching off the controller circuit in case of an interruption of said feedback loop.

2. The switched mode power supply of claim 1, wherein said second protection circuit comprises a first integrating circuit coupled to said comparator output and said first comparing circuit is coupled to said first integrating circuit for controlling a threshold level.

3. The switched mode power supply of claim 1, wherein to said first input of said second comparing circuit an information signal about the average level of the input voltage is coupled.

4. The switched mode power supply of claim 1, wherein said switching transistor is coupled with a current input to an output terminal of said inductor and with a current output to a reference potential, and wherein said rectifying means is coupled to said output terminal of said inductor for operating in a step-up converter mode.

5. The switched mode power supply of claim 1, wherein an input of said inductor is coupled to a rectified mains voltage for operating as a power factor correction pre-converter.

6. The switched mode power supply of claim 1, wherein said second protection circuit is integrated into said integrated controller circuit.

7. Switched mode power supply, comprising:
an inductor coupled to an input voltage,
a switching transistor coupled to said inductor,
rectifying means coupled to said inductor for providing a rectified output voltage,
an integrated controller circuit comprising a driver circuit being coupled to a control input of said switching transistor, a comparator with a feedback input for a regulation of said output voltage, and a first integrated over-voltage protection circuit coupled internally to said comparator for switching off said driver circuit in case of a low load condition,
a feedback loop coupling said output voltage to said feedback input, and a protection circuit having a second over-voltage protection circuit comprising, a first comparing circuit coupled with an input to an output or input of said comparator for providing an over-voltage protection of said output voltage in case of a failure of said feedback loop, and a second comparing circuit with a first input, to which an output of said first comparing circuit is coupled, and with an output, which is coupled to a sense input of said controller circuit for switching off said controller circuit, wherein to said first input of said second comparing circuit in addition an information signal about an average level of said input voltage is coupled.

8. The switched mode power supply of claim 7, wherein said first integrating circuit is coupled with an input to said comparator output and wherein said first comparing circuit is coupled with an input to said first integrating circuit for controlling a threshold level.

9. The switched mode power supply of claim 7, wherein to said first input of said second comparing said short circuit information provided by said inductor is coupled.

10. The switched mode power supply of claim 7, wherein said switching transistor is coupled with a current input to an output terminal of said inductor and with a current output to a reference potential, and wherein said rectifying means is coupled to said output terminal of said inductor for operating in a step-up converter mode.

11. The switched mode power supply of claim 7, wherein an input of said inductor is coupled to a rectified mains voltage for operating as a power factor correction pre-converter.

12. The switched mode power supply of claim 7, wherein said second protection circuit is integrated into said integrated controller circuit.

13. The switched mode power supply of claim 7, wherein said protection circuit is coupled further with an auxiliary winding of said inductor for switching off said switched mode power supply in case of a short circuit in said inductor or said rectifying means.

14. Integrated circuit comprising a comparator for operating a switching transistor of a switched mode power supply in response to a feedback loop, the integrated circuit further comprising:

a first over-voltage protection circuit with a first comparing circuit coupled to an output or input of said comparator for controlling a threshold level, wherein an output of said first comparing circuit and a short circuit information provided by an inductor is coupled to a second comparing circuit of a second over-voltage protection circuit, the output of said second comparing circuit being coupled to a sense input of said first over-voltage protection circuit for switching off said integrated circuit in case of an interruption of said feedback loop, and wherein said first comparing circuit becoming active and switching off said switched mode power supply when the control voltage of said feedback loop is above said threshold level for longer than a predetermined time period.

* * * * *